BEST AVAILABLE COPY

United States Patent [19]

Takahashi

[11] E

[45] Reissued

Patent Number: Re. 33,571

Date of Patent: Apr. 16, 1991

[54] SYSTEM AND METHOD FOR AUTOMATIC TRANSACTION

[75] Inventor: Kenichi Takahashi, Niigata, Japan

[73] Assignee: Hitachi, Ltd., Tokyo, Japan

[21] Appl. No.: 404,906

[22] Filed: Sep. 8, 1989

Related U.S. Patent Documents

Reissue of:

[64] Patent No.: 4,692,600
Issued: Sep. 8, 1987
Appl. No.: 736,702
Filed: May 22, 1985

[30] Foreign Application Priority Data

Jul. 31, 1984 [JP] Japan ..... 59-159060

[51] Int. Cl.[5] ..... G06K 5/00

[52] U.S. Cl. ..... 235/379; 235/380

[58] Field of Search ..... 235/379, 380

[56] References Cited

U.S. PATENT DOCUMENTS 3,833,885 9/1974 Gentile et al. .
3,941,977 3/1986 Voss et al. .
4,114,027 9/1978 Slater et al. .
4,423,313 12/1983 Tanigaki ..... 235/379
4,438,326 3/1984 Uchida ..... 235/379
4,464,733 8/1984 Misker ..... 235/379
4,495,627 1/1985 Nishimura ..... 235/379
4,692,600 9/1987 Takahashi ..... 235/379

FOREIGN PATENT DOCUMENTS

A2083259 6/1981 United Kingdom .
A2129181 5/1984 United Kingdom .
A2145265 3/1985 United Kingdom .

*Primary Examiner*—Harold I. Pitts
*Attorney, Agent, or Firm*—Fay, Sharpe, Beall, Fagan, Minnich & McKee

[57] ABSTRACT

An automatic transaction system is provided with a card reader which reads the data from a card with information identifying a user recorded thereon, when said card is inserted, an operating unit which is provided with transaction selection keys operated to input the kind of transaction a user wants, and an amount key employed to input an amount of money to be transacted and others, and a display unit which displays the instructions for said operating unit for the user. Whether or not a plurality of transactions are to be performed repeatedly is input to said operating unit by a repeated transaction key. A plurality of transactions are performed repeatedly by a control unit, based on the data read from said card reader and the operation of said repeated transaction key.

43 Claims, 7 Drawing Sheets

BEST AVAILABLE COPY

BEST AVAILABLE COPY

BEST AVAILABLE COPY

BEST AVAILABLE COPY
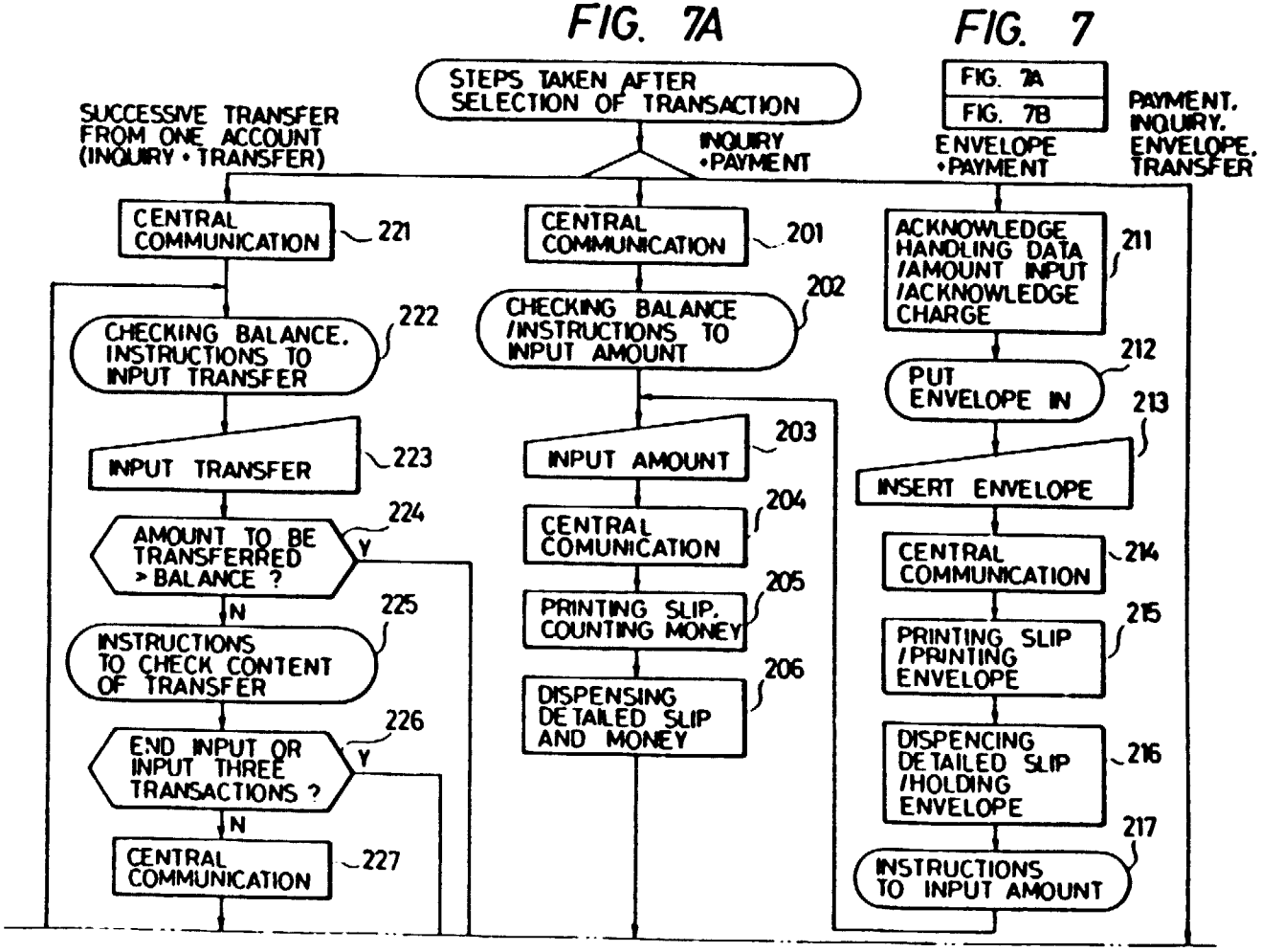

BEST AVAILABLE COPY

BEST AVAILABLE COPY

BEST AVAILABLE COPY

SYSTEM AND METHOD FOR AUTOMATIC TRANSACTION

Matter enclosed in heavy brackets [ ] appears in the original patent but forms no part of this reissue specification; matter printed in italics indicates the additions made by reissue.

BACKGROUND OF THE INVENTION

The present invention relates to an automatic transaction system which handles paper money automatically in financial institutions such as banks by reading cards, and in particular it relates to the system which is suited to a plurality of transactions on one occasion.

General automatic transaction systems have a construction in which a single transaction or a variety of transactions are set so that a user (customer) can perform a transaction by inserting his card once.

A system disclosed in the Official Gazzette on Japanese Patent Laid-Open No. 32596/1973, for instance, is constructed so that it enables the selection of payment of cash and transfer to another account, while enabling the release of cash or the automatic transfer of a paid amount on data to said account without releasing cash according to the selection of payment or transfer. Meanwhile, a system disclosed in the Official Gazette on Japanese Patent Laid-Open No. 37342/1978 is designed so that it can operate to transfer an amount equivalent to the amount of money received from a user to an account of a specified transferee read from a card on which information on the deposit of the user and the account number of said account are recorded, thus enabling simple transfer operations to the [apecified] *specified* transferee without recording the number of his account.

When one user desires to perform a plurality of transactions in the systems disclosed in the above-mentioned Official Gazettes, however, he is required to conduct an initial operation, that is insert a card, for every transaction. He must pull out the card after the completion of one transaction and insert said card again to perform another transaction. Thus, the user must put the card in and take it out for each transaction, while entering his code number and other data, which results in the disadvantage that repeated transactions take much time.

SUMMARY OF THE INVENTION

An object of the present invention is to provide a system and a method for automatic transactions, by which a plurality of transactions are performed repeatedly.

Another object of the present invention is to provide a system and a method for automatic transactions, by which transactions of different kinds are performed simultaneously.

A third object of the present invention is to provide a system and a method for automatic transaction, by which the time required for transactions is reduced.

The present invention has a construction in which the operating unit having transaction selection keys and an amount key to input an amount of money to be transacted and other data is provided with a repeated transaction key to input whether transactions are performed at desired times, and a means is provided to enable repeated transactions at desired times by the operation of said repeated transaction key when a card reading mechanism is driven, so that the number of operations including operations to put in and take out a card can be reduced to the minimum.

BRIEF DESCRIPTION OF THE DRAWINGS

FIGS. [74] *7A* and *7B* are flowcharts of a procedure of operations corresponding to the illustration of FIG. 6, which shows a second embodiment of the automatic transaction system according to the present invention.

DETAILED DESCRIPTION OF THE INVENTION

Figure 1:
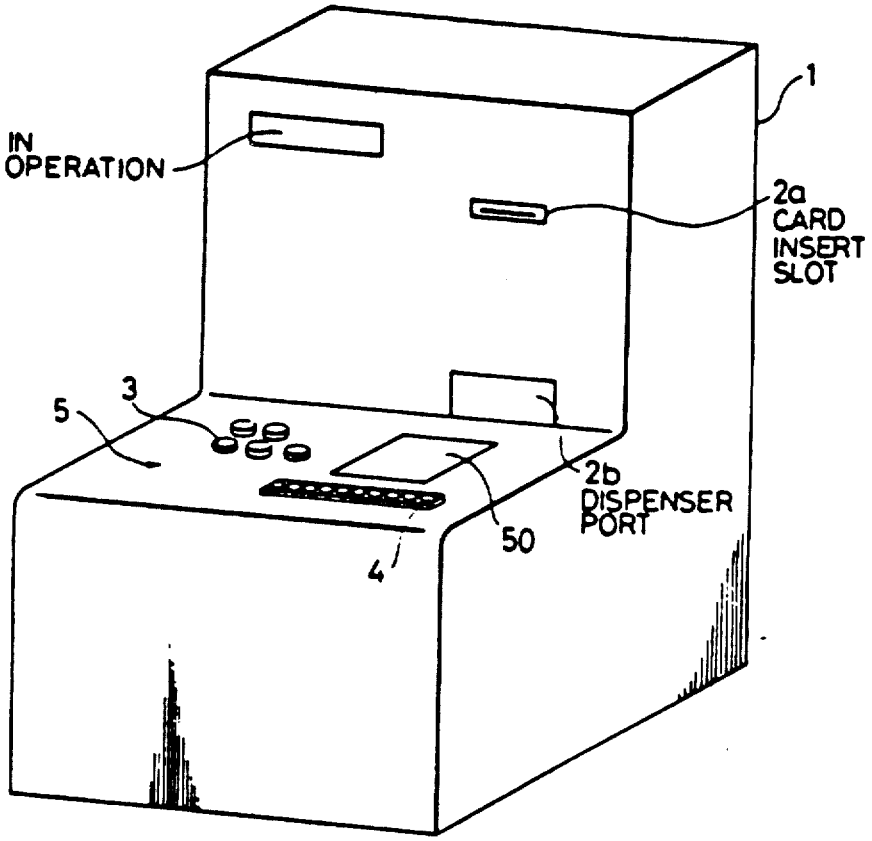
FIG. 1 is a [plan] *perspective* view of an automatic cash transaction system which is a first embodiment of the present invention.

The following is a description of the present invention with reference to appended drawings. FIGS. 1 to 4 show a first embodiment of the present invention which is applied to an automatic cash transaction system.

The automatic cash transaction system of this embodiment is disposed in the front upper portion of a main body 1 of an apparatus, and a card insert slot 2a into which a magnetic card A with identification recorded thereon is inserted removably, and a dispenser port 2b which is provided below said card insert slot to dispense paper money and a detailed transaction slip, are formed therein. Moreover, an operating unit 5 having transaction selection keys 3 to select and input the kind of transaction and amount keys 4 to input the amount of money to be transacted and a personal code number etc. is provided in a console of the main body 1 to enable a user to conduct a transaction, while a display unit 50 is provided in said console to display instructions for the user.

Figure 2:
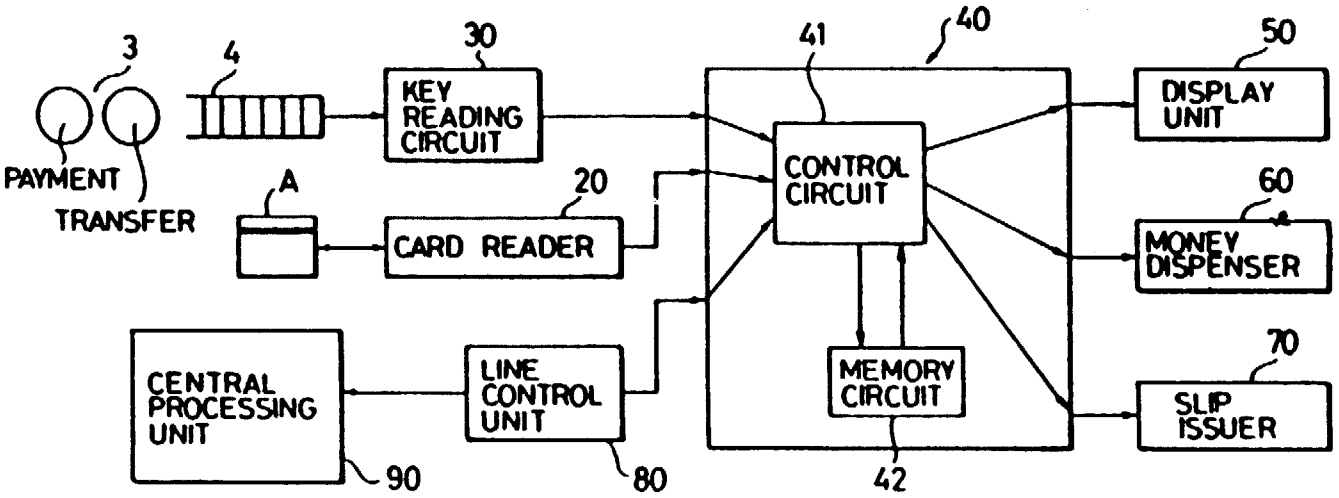
FIG. 2 is a block diagram of the automatic cash transaction system.

FIG. 2 is a block diagram showing the entire construction of the system. In this figure, numeral 20 denotes a card reader which operates when a magnetic card A is inserted into the card insert slot 2a. The reader conveys the magnetic card A to a prescribed position, reads data from the magnetic card, and returns the card to the insert slot 2a when the transaction is complete. Numeral 30 denotes a key reading circuit which reads the content which the user (customer) inputs from the operating unit 5 in response to instructions display from said display unit 50.

Numeral 60 denotes a paper money dispenser which takes out bank notes from a cash box and conveys them to the release port 2b when the transaction is repayment. Numeral 70 denotes a slip issuer which prints the content of the transaction on an entry journal for the financial institution and a detailed transaction slip to be

BEST AVAILABLE COPY delivered to the user and dispenses said detailed transaction slip to the dispenser port 2b.

Numeral 40 denotes a control unit comprising a control circuit 41 and a memory circuit 42. This unit performs the transfer of data to and from the above-stated devices, controlling each of them in accordance with a program stored in said memory circuit 42. Numeral 90 denotes a central processing unit, which checks and updates information of the user and transmits the result of the processing to the control circuit 41 through a circuit controlling *or line control* unit 80.

Figure 3:
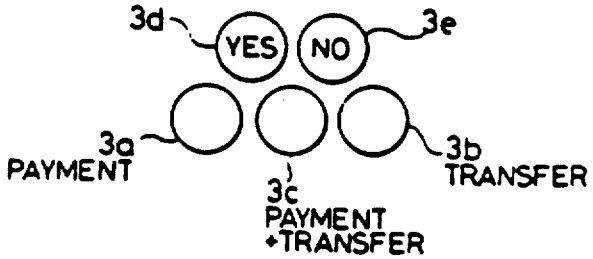
FIG. 3 is an enlarged view of transaction selection keys to the operating unit.

In the present embodiment, as shown in FIG. 3, the transaction keys 3 of the aforesaid operating unit 5 comprise single keys 3a and 3b each of which inputs one kind of transaction, and a combination key 3c to input transactions of different kinds in combination. Said single keys 3a and 3b input information on payment and transfer transactions respectively in the present embodiment, and by pressing either of the keys, a transaction corresponding thereto can be input. Said combination key 3c enables the simultaneous input of information on transactions of different kinds when it is pressed. It functions, for instance, to input data on two kinds of transactions; payment and transfer. By operating the combination key 3c, combined transactions can be performed at the same time.

Also, the said operating unit 5 is provided with repeated transaction keys 3d and 3e to input an information on whether a transaction is to be performed repeatedly to the transaction selection keys 3 and the amount key 4. Said repeated transaction keys 3d and 3e are provided to input information on whether transactions of the same kind or transactions of different kinds are to be repeated. A YES key and a NO key are employed, for instance, as these successive transaction keys 3d and 3e, and a transaction can be repeated by pressing the YES key in response to displayed instructions, while no subsequent transaction is conducted when the NO key 3e is depressed.

Figure 4:
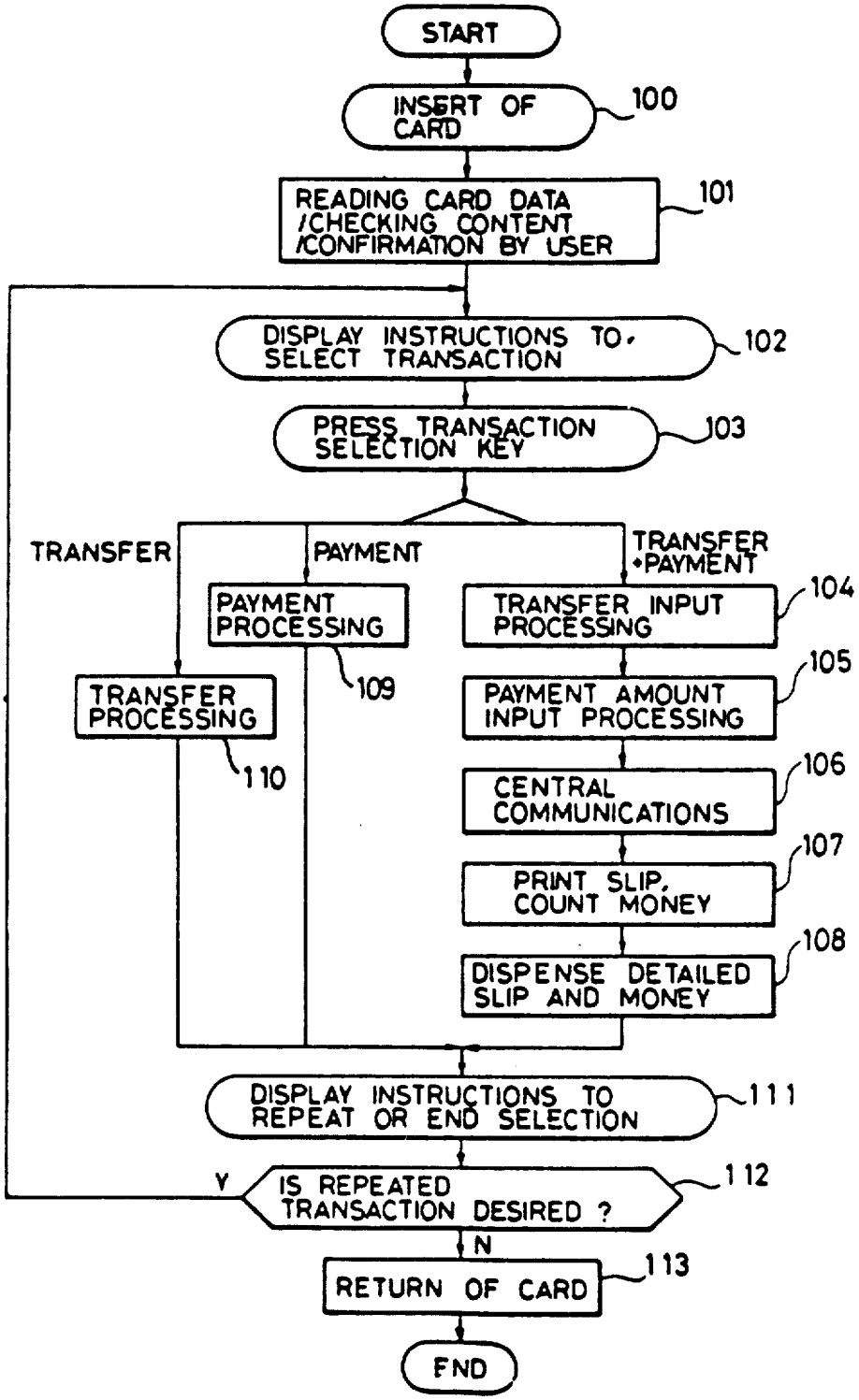
FIG. 4 is a procedure flowchart of a procedure of operations.

Next, a transaction will be described with reference to a flowchart shown in FIG. 4.

When a user inserts a magnetic card A into the card insert slot 2a (step 100), the card data recorded on said magnetic card A is read by the card reader 20 and sent to the control circuit 41, whereby the content (information) of the deposit of the user is checked (step 101) and, the personal code number input by the customer is checked. Hereinafter numerals alone are given in parenthesis. The magnetic card A is returned when the check shows that the content is not normal, while a message "Select transactions" is displayed by the display unit 50 (102) when said check shows normality. In response to the display, the user selects one of the transaction selection keys 3 of the operating unit to input a transaction (103).

When the user pushes the combination key 3c desiring both payment and transfer transactions on the occasion, first a transfer input processing is performed (104), and then a payment amount input processing (105). In said transfer input processing, the data on the transferee's bank, a transfer account and a transferred amount are sent to the control unit 40 when the user inputs this data in a prescribed form by operating the amount key 4 in response to the display in the display unit 50. In the above-stated payment amount input processing, the data on an amount to be repaid are sent to the control unit 40 when the user inputs said data in the prescribed form.

Then, the input data on the transfer and payment amounts are sent from the control unit 40 to the central processing unit 90 through a line control unit 80, and said central processing unit 90 processes the data, checking and renewing information on the user, and transmits data on the propriety of the transaction to the control unit 40 based on the result of the above processing (106). Said control unit 40 performs processing on the basis of the data sent from the central processing unit 90. More precisely, it performs processing to suspend the transaction when it receives from unit 90 an instruction to suspend the transaction, while it drives the slip dispenser 70 and the money dispenser 60 to print the content of the transaction on a slip and to count the number of sheets of paid bank bills and the value thereof (107) and to release the slip with the details of the transaction recorded and the bank bills to the dispenser port 2b (108), when it receives from said unit 90 an instruction to perform the transaction. Then, both contents of transfer and payment transactions are printed on the detailed transaction slip. Thus, the user can receive the detailed transaction slip and the money.

As described above, transactions of two kinds (payment, transfer) can be performed as the same time by operating the combination key 3c, and thus said transactions can be performed with just one insertion of the magnetic card A and just one input of personal code number by the customer.

When the user pushes the payment key 3a for performing a single transaction, processings similar to steps 105 to 108 above is performed (109), and thereby the detailed transaction slip with a payment amount printed thereon is released. When the user pushes the transfer key 3b, on the other hand, processing similar to steps 104 and 106 to 108 above is performed (110), and thereby the detailed transaction slip with a transferred amount printed thereon is dispensed. Thus, the user can also perform single transactions.

After these transactions are complete, a message "Is another transaction desired?" appears on the display unit 50 (111), and whether or not transactions are performed repeatedly is determined (112), based on which of the transaction keys 3d and 3e is repeatedly pressed by the user.

When the user presses down the NO key 3e, it is determined that another transaction is not desired. Consequently, the magnetic card A is returned to the card insert slot 2a (113), and when the returned card A is received by the user, the transaction is complete. When the user presses the YES key 3d, it is determined that another transaction is desired, and processing beginning with step 102 is repeated. By pressing any one of the transaction selection keys 3 with the YES key 3d depressed, single transactions, as well as combined transactions, can be performed repeatedly. Thus, the transactions can be performed as needed only by inserting the magnetic card A only once and inputting the personal code number only once.

The transaction selection keys 3 are designed to have specific functions in the embodiment shown in the above-mentioned figures, and three transaction selection keys are provided in this case in accordance with the kinds of transactions. In this connection, the number of the transaction selection keys would be increased unfavorably with an increase in the kinds of transactions. This unfavorable increase in the number of keys can be prevented by a construction in which the transaction selection keys are designed so that they can be

Figure 5A:
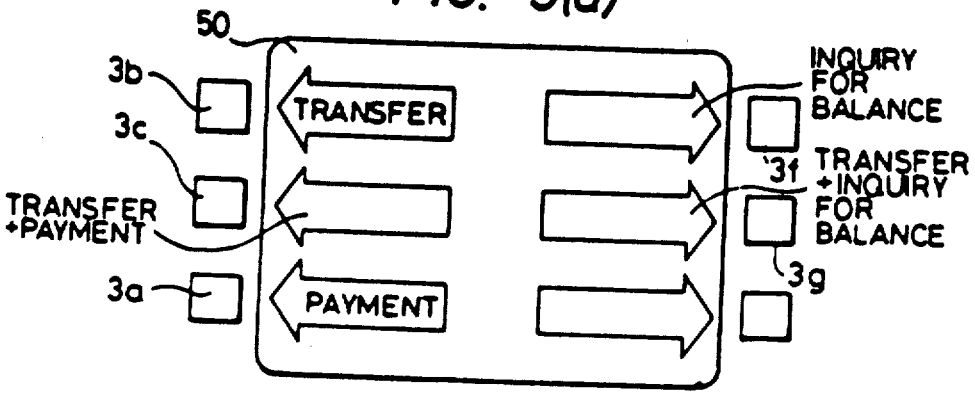
FIG. 5(a) and (b) are illustrations of transaction selections and a successive transaction, respectively, showing another example of combination of the transaction selection keys with a display unit.
Figure 5B:
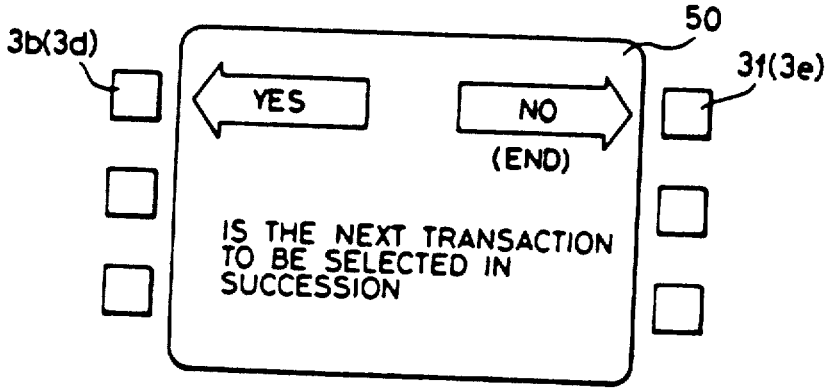

BEST AVAILABLE COPY operated to input functions corresponding to expressions displayed on a screen of a display unit. The display unit 50 is so constructed that messages are displayed on the CRT screen, a caption film or the like, as shown in FIG. 5(a), while the keys are 3 are arranged at positions corresponding to said various selection messages. When a key 3 is pressed in this construction, the function indicated by the message at a position corresponding to said key 3 can be input. Therefore, when a key 3b in the upper left portion in FIG. 5(a) is assigned to operate for transfer, and when the same key 3b in the upper left portion in FIG. 5(b) is designed to fulfill the same function as the YES key 3d, the increase in the number of keys can be prevented, while the same effect as with the first embodiment can be obtained. While the kinds of transactions are limited to payment, transfer, and payment with transfer, in the embodiment shown in the above-mentioned figures, they can be increased, as shown in FIG. 6, by enlarging the dimensions of the screen of the display unit 50, by increasing the number of keys provided, or by other means.

Figure 7B:
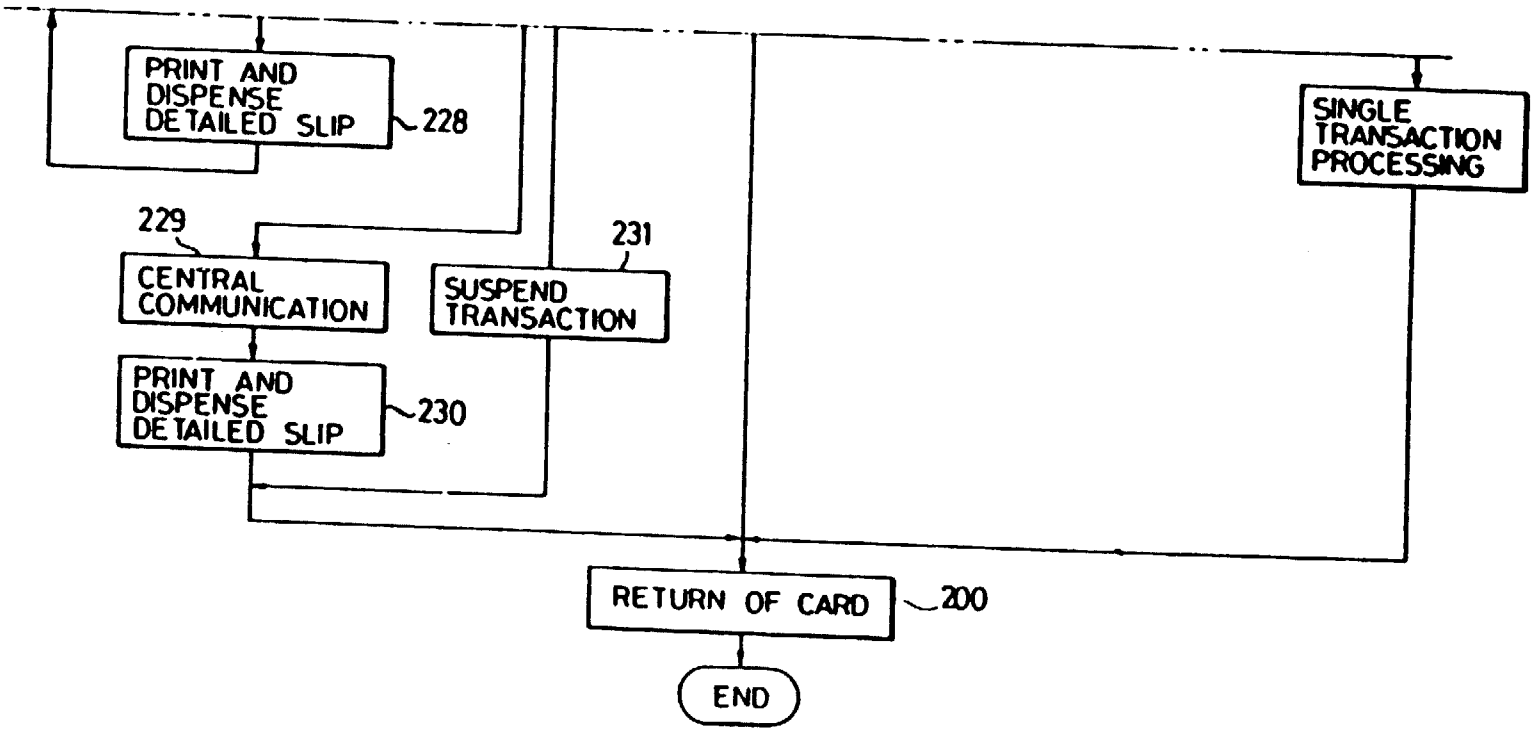
Figure 6:
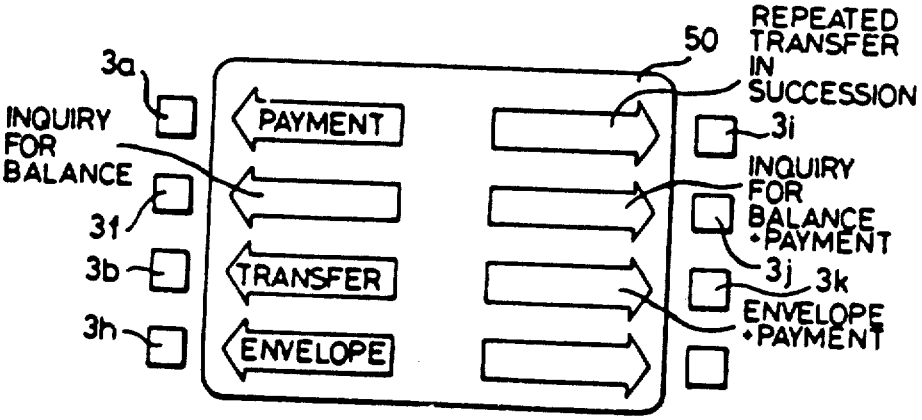
FIG. 6 is an illustration of a third example of combination of the transaction selection keys with the display unit.

FIG. 7 is a flowchart based on FIG. 6 which shows a second embodiment of the present invention. In this embodiment, the above-described transaction selection keys 3 are so designed as to be able to input single transactions such as payment, transfer, balance inquiry and *deposit including* dispensing an envelope, as well as combined transactions such as payment with inquiry, payment with *deposit including* the dispensed envelope, and to input only transfers repeatedly.

The following is a description on the operations of this embodiment with reference to FIG. 7.

When a user presses a key 3j for inquiry+payment, the control unit 40 and the central processing unit 90 (201) communicate, and the control unit 40 causes the display unit 50 to display the user's balance. Then, the display unit 50 displays message "Input an amount to be repaid after checking the balance" (202).

After the amount is input by the user (203), communications is made again with the central processing unit 90 (204). When an instruction to allow a transaction is given as the result of the above processing, a slip is printed and money is counted (205), a detailed transaction slip and the paper money are dispensed (206), the magnetic card A is returned (200), and the transaction is complete.

When a key 3k for *deposit with* an envelope+payment is input by the user, information on the amount and other data which is required for printing the envelope is also input thereby (211), and then message "Put the envelope in" is displayed (212). When the envelope is put in (*213*), in response to said message, communications are conducted with the central processing unit 90 (*214*), a slip and the envelope are printed in response to the communications (215), and then the envelope is put in a cash box to be held, while a detailed transaction slip is dispensed (216). Next, after the envelope dispensing transaction has ended, a message directing payment transaction is displayed (217), steps 203 to 206 and 200 are performed in the same way as in the transaction of inquiry+payment, and the transaction is ended.

When the user presses a key 3i for repeated transfer, communications are made with the central processing unit 90 (221), and after information on a balance displayed in accordance with the result of the above processing has been checked by the user, an expression "Input transfer after checking the balance" is displayed by the display unit 50 (222). When an amount to be transferred is input by the user (223), it is compared with the balance (224). If the comparison shows that the amount to be transferred is greater than that of the balance, a processing is conducted *and* and the transaction is suspended (231). If the amount to be transferred is smaller than that of the balance, a display is made directing the confirmation of the content of the transfer (225). When the user inputs his confirmation, it is determined that the confirmation is input, while it is determined whether the operation of the above confirmation input is the third one (for the third transaction) (226).

When the operation of the confirmation input is the first one (for the first transaction), communication is conducted with the central processing unit (227), and the content of the transaction is printed on a slip according to an instruction to allow the transaction, and a detailed transaction slip thus prepared is dispensed (228). Subsequently, 222 to 228 are repeated. When the confirmation input is determined to be the third [or higher] at step 226, processong described hereunder is conducted. When the confirmation input is the third one steps 226 [to], 229 and 230 are performed, and the detailed slip is dispensed. In this case, the system is set by the operation of the repeated transfer key 3i so that the first to third transfers can be performed repeatedly provided that the transferred amount is within the balance.

A description of single transactions is omitted, since single transactions are performed in this case as described with reference to FIG. 4.

Figure 8:
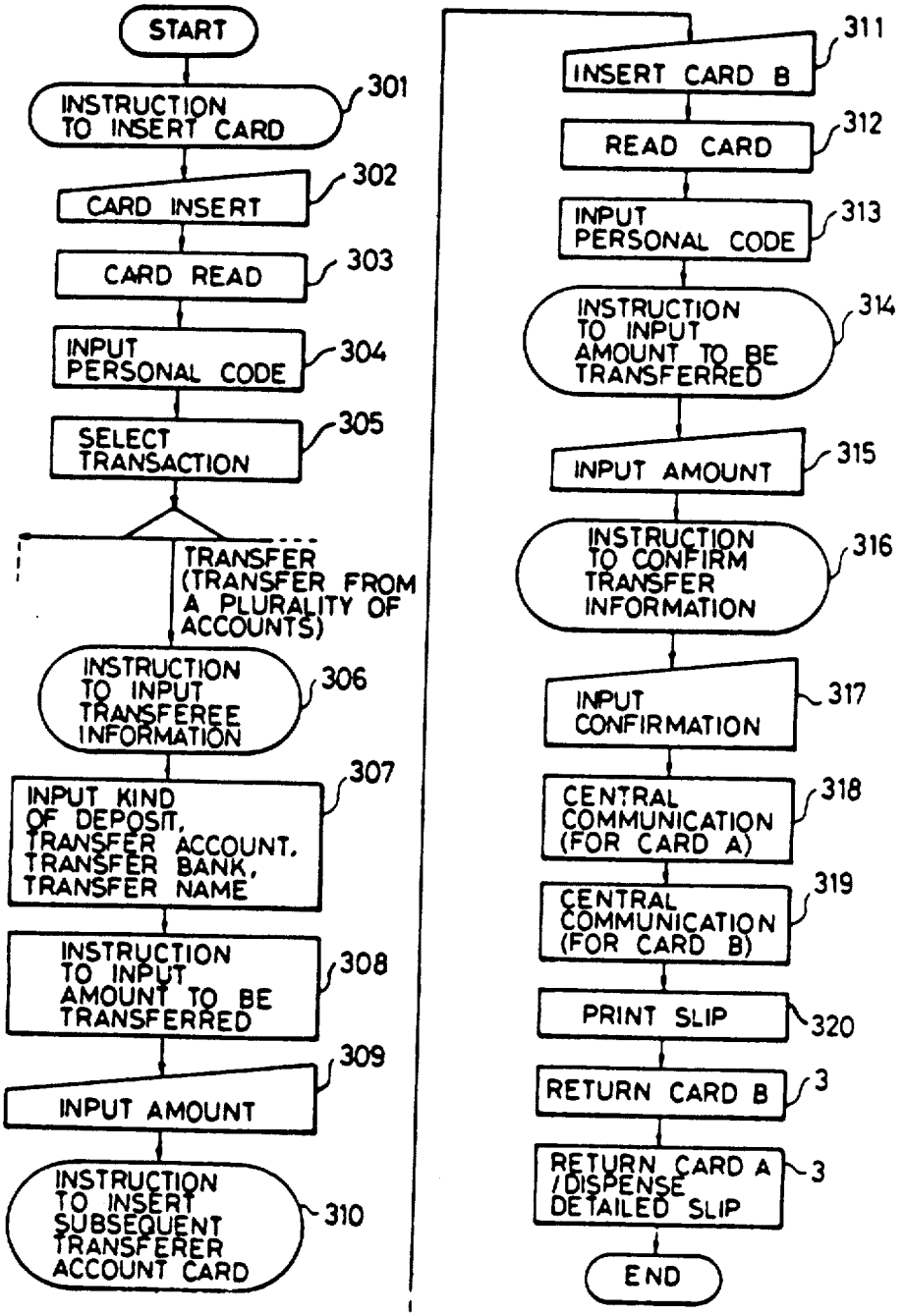
FIG. 8 is a flowchart of a third embodiment of the automatic transaction system according to the present invention.

FIG. 8 is a flowchart showing a third embodiment of the present invention. In this embodiment, the system is so designed that transfers can be made from a plurality of accounts to one account of a transferee, while transfers are made from a single account to one or a plurality of accounts of a transferee in the foregoing two embodiments.

When the display directs the user to insert a card (301) and a magnetic card A is inserted (302), processing to read card data and check a personal code number input are performed sequentially (303, 304). If an error occurs in these steps, processing to return the magnetic card A and other processing is conducted.

Next, when a transfer is selected, by pressing the transaction selection key (305), an instruction to input information on a transferee [in] *is* displayed (306), and the name of a transferee's bank, the kind of a deposit and a transfer account, etc. are input (307) according to the instruction. Then, "Input an amount to be transferred from an initial card" is displayed (308) to instruct the user (309). With this processing a transfer input with regard to the magnetic card A initially inserted is complete.

A message "Put in a card for a subsequent transfer" is then displayed (310), and when the second magnetic card B is inserted by the same user (311), steps 303 and 304 are repeated, applied to said card B (312 and 313). Then an instruction to input an amount to be transferred from the second magnetic card B is displayed (314), and the amount for the second magnetic card B is input in response to said instruction (315).

After an instruction to confirm the amounts to be transferred from the two magnetic cards A and B is displayed (316) thereafter, the confirmation is input (317), and then communication is conducted in sequence with respect to the information on the first and second magnetic cards A and B. Next, a slip is printed in response to an instruction directing the transaction,

BEST AVAILABLE COPY and the magnetic cards A and B and a detailed slip are dispensed (321, 322), whereby the transaction is ended With this embodiment, therefore, simultaneous transfers can be performed from a plurality of accounts if these transfers are made to one account.

If any of the above-described embodiments, the kind of transaction is selected after the magnetic card A is inserted. It is a matter of course, in this connection, that a program can be altered so that the transaction can be selected before the magnetic card A is inserted. Moreover, an on-line system in which the control unit 40 is connected to the central processing unit 90 is shown as an example in these embodiments. These embodiments can also be adapted for an off-line system by using a construction in which information required for transactions is stored in the memory circuit 42 of the control unit 40 and this unit performs the same processing as the central processing unit 90 based on said information. Also, the magnetic cards are employed as examples in these embodiments. However, the present invention is not limited to these cards; it can be applied also to a system in which IC cards or optical stripe cards, for instance, are employed.

As described above, the present invention is so constructed that not only transactions of different kinds, but also transactions of the same kind, can be performed as needed by pressing the repeated transaction keys; hence, one user can perform transactions repeatedly without re-inserting the card. With the present invention, therefore, it is unnecessary for one user to repeat such operations as putting the card in and taking it out and entering a personal code number, which produces remarkable effects of saving time and shortening the time required for transactions.

I claim:

1. A system for automatic transactions, comprising:

a medium reader for receiving an inserted medium from a customer and for reading data from said medium in which information identifying said customer is recorded;

a operation unit provided with transaction selection keys comprising single transaction and combination keys to input transactions of different kinds in combination, and a numerical key to input numerical values and personal code number of said customer;

a display unit for displaying instructions for operation to said customer; and a control unit for performing a single transaction based on data read by said medium reader and of said selection keys, and for performing a plurality of different transactions based on data read from said medium and said combination keys, in repsonse to one insertion of said medium to said medium reader and one input of the personal code number of said customer.

2. A system as claimed in claim 1, in which said transactions include an inquiry requesting the value of a balance, and in response to said inquiry, said display unit displays the value of the balance to be confirmed by said customer relative to another transaction performed [simultaneously] *subsequently* by said control unit.

[3. A system for automatic transactions, comprising:

a medium reader for receiving an inserted medium from a customer, and for reading data from said medium in which information identifying said customer is recorded;

a operation unit provided with transaction selection keys comprising a repeated transaction key to input signals specifying whether a next transaction is to be performed successively, and a numerical key to input numerical values and personal code number of said customer;

a display unit for displaying instructions for selection or whether different transactions are to be performed successively for said customer; and a control unit for performing first and second transactions successively based on data from said medium and the signal input by said repeated transaction key, in response to one insertion of said medium to said medium reader and one input of the personal code number by said customer.]

[4. A system as claimed in claim 3, in which said control unit performs said second transaction when said repeated transaction key is operated by said customer in response to instructions of said display unit after the completion of said first transaction.]

[5. A system as claimed in claim 3, in which one of said first and second transaction is an inquiry requesting the value of a balance, and in response to said inquiry, said display unit displays value of the balance to be confirmed by said customer in relation to the other of said first and second transaction performed successively.]

6. A system for automatic transactions, comprising:

a medium reader for receiving inserted a plurality of media from a customer and for reading data from said media in which information identifying said customer is recorded;

a operating unit provided with transaction selection keys comprising single keys to input a single transaction and combination keys to input a plurality of transactions, and a numerical key to input numerical values and the personal code number of said customer;

a display unit for displaying instructions for operation to said customer; and a control unit for performing a single transaction based on data read from said medium and the operations of said single keys, and for performing a plurality of transactions with a plurality of accounts, based on the read data from said media and the operation of said combination keys, with one insertion of each media and one input of personal code number corresponding to said each medium by said customer.

7. A system as claimed in claim 6 in which said media is inserted into said medium reader in response to the instructions of said display unit by said customer, said transactions to be performed are transfer transactions from a plurality of accounts, and said control unit performs transfers from a plurality of accounts corresponding to said media to an account of a transferee.

8. A method for automatic transactions, comprising:

inserting a medium of a customer;

reading data from said medium including information identifying said customer;

inputting a personal code number to identify said customer;

displaying instructions to select a transaction including a single transaction or a combined transaction;

inputting a transaction based upon said instructions; and performing a single transaction on the basis of the data of the medium read and in accordance with

BEST AVAILABLE COPY the single transaction input, and performing a plurality of transactions [simultaneously] *subsequently* on the basis of the same data from said medium when said transaction is a combined transaction, in response to one insertion of said medium and one input of said personal code number by said customer.

[9. A method for automatic transactions, comprising:

inserting a medium of a customer;

reading data from said medium including information identifying said customer;

inputting a personal code number to identify said customer;

displaying instructions to select a kind of transaction including a single transaction or a repeated transaction;

inputting a signal specifying the kind of transaction based on said instruction; and performing a prescribed transaction on the basis of the data of the medium read and in accordance with the kind of transaction input, and performing first and second transactions successively on the basis of the same data from said medium when said kind of transaction is a repeated transaction, in response to one insertion of said medium and one input of said personal code number by said customer.]

[10. A method for automatic transactions, comprising:

inserting a medium of a customer;

reading data from said medium including information identifying said customer;

inputting a personal code number to identify said customer;

displaying instructions to select a kind of transaction;

inputting a signal specifying the kind of transaction based on said instructions;

performing a prescribed first transaction on the basis of the data of the medium read and in response to the kind of transaction input;

displaying instructions to select repeated transactions which are to be performed successively on the basis of said data;

selecting the repeated transaction in response to said display; and performing a second transaction successively after completion of said first transaction, in response to one insertion of said medium to said medium reader and one input of the personal code number by said customer.]

*11. A system for automatic banking transactions, comprising:*

*medium reader means for receiving a medium from a customer and for reading data from said medium in which information identifying said customer is recorded;*

*an operation unit provided with at least one combination transaction selection key to input the selection of the combination transaction, and at least one number key to input numerical values by the customer;*

*display means for displaying instructions and data for operation to the customer;*

*control means for identifying the customer in response to the information identifying said customer and providing customer banking information;*

*said control means further performing a first banking transaction based upon said customer banking information and one selection of said combination transaction selection key and thereafter performing a second banking transaction based upon the customer banking information and said selection of the combination transaction selection key with automatic flow from the first banking transaction to the second banking transaction in response to only one reading data from said medium and only one selection of said combination transaction selection key.*

*12. The system according to claim 11, wherein said operation unit further includes at least one single transaction selection key; said control unit further being responsive to said single transaction key and the customer banking information for performing only a single transaction with only one reading data from said medium and only one selection of a single transaction selection key.*

*13. The system according to claim 11, wherein said control means automatically repeats said first transaction as said second transaction.*

*14. The control system according to claim 11, wherein said control means, in response to said customer banking information provides a fixed number of times for counting transaction repetitions;*

*said control means automatically repeats said first transaction successively for the fixed number of times.*

*15. The system according to claim 11, wherein said medium reader receives an encoded card and reads the encoded card; and further including means for receiving customer identification information and being in addition to said medium reader means and the customer identification card.*

*16. The system according to claim 15, wherein said medium reader includes said numerical key for the entry of a personal identification number of the customer.*

*17. The system according to claim 11, wherein said control means stops processing and requests, through said display means, information from said customer for use in the remainder of said transaction.*

*18. The system according to claim 11, wherein said first transaction and said second transaction are transactions of different kinds.*

*19. The system according to claim 18, wherein said control means provides said first transaction as an inquiry requesting the value of a balance, and in response to said inquiry said display means displays the value of the balance to be confirmed by the customer relative to the second transaction.*

*20. The system according to claim 19, wherein said control means performs said second transaction in response to said balance being a limit of said second transaction.*

*21. The system according to claim 20, wherein said control means, as a part of said second transaction, requests input of a numerical amount from said numerical key, halts operation waiting for said input, and after said input compares the input amount with the balance.*

*22. The system according to claim 12, wherein said control means provides said first and second transactions as transactions of a different kind.*

*23. The system according to claim 14, wherein said control means provides a comparison of the number of repetitions of said second transaction with said fixed number; and*

*said control means in response to said comparison indicating that the number of repetitions is less than the fixed number, said control means further repeating said second transaction automatically for a fixed number of times without customer choice or selection of the repetition.*

BEST AVAILABLE COPY

24. The system according to claim 11, wherein one of the said first and second transactions is a payment inquiry and the other is a deposit with dispensing of an envelope.

25. The system according to claim 11, wherein said first transaction is balance inquiry and said second transaction is a transfer of funds.

26. The system according to claim 11, wherein said first transaction is balance inquiry and said second transaction is a payout of funds.

27. The system according to claim 26, including a second combination transaction selection.

28. The system according to claim 27, wherein, in response to said second combination transaction key, said control means performs two transactions, one of which is the same as one of said first and second transactions and the other of which is different.

29. The system according to claim 11, including a second combination transaction selection.

30. The system according to claim 29, wherein, in response to said second combination transaction key, said control means performs two transactions, one of which is the same as one of said first and second transactions and the other of which is different.

31. The system according to claim 21, wherein said control means, in response to said customer banking information provides a fixed number of times for counting transaction repetitions;

said control means automatically repeats said first transaction successively for the fixed number of times.

32. The system according to claim 31, wherein said control means provides a comparison of the number of repetitions of said second transaction with said fixed number; and said control means in response to said comparison indicating that the number of repetitions is less than the fixed number, said control means further repeating said second transaction automatically for a fixed number of times without customer choice or selection of the repetition.

33. The system according to claim 32, wherein said operation unit further includes at least one single transaction selection key; said control unit further being responsive to said single transaction key and the customer banking information for performing only a single transaction with only one reading data from said medium and only one selection of a single transaction selection key;

said medium reader receives an encoded card and reads the encoded card; and further including means for receiving customer identification information and being in addition to said medium reader means and the customer identification card; and said medium reader includes said numerical key for the entry of a personal identification number of the customer.

34. A system for automatic transactions, comprising:

a medium reader for receiving a medium from a customer and for reading data from said medium in which information identifying said customer is recorded;

an operation unit provided with transaction selection keys comprising at least one combination key to provide a single input specifying a plurality of transactions in combination, and a numerical key to input numerical values;

a display unit for displaying instructions for operation to said customer;

a control unit for performing a plurality of transactions in combinations based on data read from said medium and input by said combination key, in response to one insertion of said medium to said medium reader.

35. A system according to claim 34, wherein said operation unit, with said numerical key, inputs a personal code number of the customer; and said control unit performs said plurality of transactions in combination in response to one input of the personal code number by the customer.

36. A system according to claim 35, wherein said control unit is responsive to only one medium from the customer.

37. A system according to claim 34, wherein said control unit is responsive to only one medium from the customer.

38. A system for automatic transactions, comprising:

a medium reader for receiving an inserted medium from a customer, and for reading data from said medium to which information identifying said customer is recorded;

an operation unit provided with transaction selection keys comprising at least one transaction key to input signals for repeatedly performing the same transaction, and at least one numerical key to input numerical values;

a display unit for displaying instructions for operation to the customer; and a control unit for performing only said transaction successively and automatically based on data from said medium and only one signal input by said transaction key, in response to one insertion of said medium to said medium reader and one input signal from said transaction key.

39. A system according to claim 38, wherein said operation unit numerical key is further to input a personal code number of the customer; and said control unit performs said transaction repeatedly in response to one input of the personal code number of the customer.

40. A system for automatic transactions, comprising:

a medium reader for receiving a medium from a customer, and for reading data from said medium in which information identifying said customer is recorded;

an operation unit provided with transaction selection keys comprising single transaction keys and at least one combination key to input a signal specifying first and second transactions to be performed automatically in succession, and a numerical key to input numerical values and personal code number of said customer;

a display unit for displaying instructions for operation to said customer; and a control unit for performing a single transaction based upon signal input by a single transaction key; and said control unit for performing, based uoon a signal input from said combination transaction key, a first transaction, for displaying a result of the performance of said first transaction, and for performing a second transaction, automatically in order, based upon data read from said medium and a signal input by said combination key, in response to one insertion of said medium to said medium reader, one input of the personal code number by said customer, and one actuation of said combination key.

41. A system according to claim 40, wherein said control unit repeats said first and second transactions automatically without customer selection.

42. A system for automatic transactions, comprising:

a medium reader for receiving a medium from a customer and for reading data from said medium in

BEST AVAILABLE COPY

*which information identifying said customer is recorded;*

*an operation unit provided with transaction selection keys comprising at least one combination key to provide a single input specifying a plurality of transactions in combination, and a numerical key to input numerical values;*

*a display unit for displaying instructions for operation to said customer; and*

*a control unit for performing a plurality of transactions based on the read data from said media and the operation of said combination keys with one receipt of each media by said customer.*

*43. A system for automatic transactions, comprising:*

*a medium reader for receiving a medium from a customer and for reading data from said medium in which information identifying said customer is recorded;*

*an operation unit provided with transaction selection keys comprising at least one combination key to provide a single input specifying a plurality of transactions in combination, and a numerical key to input numerical values;*

*a display unit for displaying instructions for operation to said customer;*

*a control unit for performing a plurality of transactions in combination and for thereafter performing another plurality of transactions in combination, in response to one insertion of said medium to said medium reader.*

*44. A method for automatic banking transactions, comprising:*

*receiving a medium from a customer, reading data from said medium and recording information identifying said customer;*

*from an operation unit provided with at least one combination transaction selection key to input the selection of the combination transaction, and at least one number key to input numerical values by the customer selecting said combination transaction key only once;*

*displaying instructions and data for operation to the customer;*

*identifying the customer in response to the information identifying said customer and providing customer banking information;*

*performing a first banking transaction based upon said customer banking information and one selection of said combination transaction selection key and thereafter performing a second banking transaction based upon the customer banking information and said selection of the combination transaction selection key with automatic flow from the first banking transaction to the second banking transaction in response to only one reading data from said medium and only one selection of said combination transaction selection key.*

*45. The method according to claim 44, wherein said operation unit further includes at least one single transaction selection key; in response to said single transaction key and the customer banking information, performing only a single transaction with only one reading data from said medium and only one selection of a single transaction selection key.*

*46. The method according to claim 44, including automatically repeating said first transaction as said second transaction.*

*47. The method according to claim 44, including receiving an encoded card and reading the encoded card; and further including means for receiving customer identification information and being in addition to said medium reader means and the customer identification card; and*

*numerical key entering a personal identification number of the customer.*

*48. The method according to claim 44, including stopping processing and requesting, through said display means, information from said customer for use in the remainder of said transaction.*

• • • • •